(12) United States Patent
McKinstry et al.

(10) Patent No.: US 9,948,495 B2
(45) Date of Patent: Apr. 17, 2018

(54) SAFE STATE FOR NETWORKED DEVICES

(71) Applicant: Allied Telesis Holdings Kabushiki Kaisha, Tokyo (JP)

(72) Inventors: Mark Andrew McKinstry, Christchurch (NZ); Theuns Verwoerd, Christchurch (NZ); Anthony Robert Lineham, Christchurch (NZ); Graeme Campbell, Graeme Keith Campbell (NZ)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 813 days.

(21) Appl. No.: 13/754,680

(22) Filed: Jan. 30, 2013

(65) Prior Publication Data

US 2013/0198347 A1   Aug. 1, 2013

Related U.S. Application Data

(60) Provisional application No. 61/592,341, filed on Jan. 30, 2012, provisional application No. 61/745,541, filed on Dec. 21, 2012.

(51) Int. Cl.
*G06F 13/00* (2006.01)
*H04L 12/24* (2006.01)

(52) U.S. Cl.
CPC .......... *H04L 41/00* (2013.01); *H04L 41/0803* (2013.01)

(58) Field of Classification Search
CPC . H04L 41/0803; H04L 41/0813; H04L 41/00; G06F 15/177

(Continued)

(56) References Cited

U.S. PATENT DOCUMENTS 6,990,111 B2   1/2006   Lemoff et al.
8,270,933 B2 *  9/2012   Riemer et al. ................ 455/345

(Continued)

FOREIGN PATENT DOCUMENTS

EP   0841824 A2   5/1998
EP   2096790 A2   9/2009

(Continued)

OTHER PUBLICATIONS

EP Search Report for serial No. EP13743086 dated Jun. 11, 2015.
International Search Report for Serial No. PCT/US2013/023940 dated May 24, 2013.

*Primary Examiner* — Kenneth R Coulter
(74) *Attorney, Agent, or Firm* — Brooks Acordia IP Law, PC; Michael Zarrabian (57) ABSTRACT

A method placing a device in safe state is disclosed. The method includes initiating a safe state for a device. In one embodiment, an operational functionality of the device is disabled. A safe state message at an interface of the device may be received. The interface may be designated as a management interface. Information may be received at the management interface, wherein the information manages the device. The method may also include disabling a non-management interface of the device, wherein the non-management interface is an interface that does not receive a safe state message. The method may further include shutting down a non-management interface of the device, wherein the non-management interface is an interface that does not receive a safe state message. A normal state for the device may be initiated, wherein in the normal state the device restores the operational functionality of the device.

22 Claims, 6 Drawing Sheets

(58) Field of Classification Search
USPC .............. 709/220–222, 227–229, 223, 250;
726/26, 27
See application file for complete search history.

(56) References Cited

U.S. PATENT DOCUMENTS

| | | |
|---|---|---|
| 8,565,820 B2 * | 10/2013 | Riemer et al. ................ 455/557 |
| 8,832,259 B1 * | 9/2014 | Kearns et al. ................ 709/224 |
| 2003/0131311 A1 | 7/2003 | McNamara |
| 2004/0184441 A1 | 9/2004 | Wu et al. |
| 2005/0259595 A1 | 11/2005 | Preguica |
| 2006/0038688 A1 | 2/2006 | Nakamura |
| 2007/0165654 A1 | 7/2007 | Chai et al. |
| 2008/0126857 A1 | 5/2008 | Basham |
| 2009/0041037 A1 | 2/2009 | Yang et al. |
| 2009/0193109 A1 * | 7/2009 | Kuo et al. ..................... 709/223 |
| 2009/0307752 A1 * | 12/2009 | Ohashi ............................. 726/3 |
| 2010/0061231 A1 | 3/2010 | Harmatos et al. |
| 2010/0216509 A1 * | 8/2010 | Riemer et al. ................ 455/557 |
| 2010/0306352 A1 | 12/2010 | Pritikin |
| 2011/0019534 A1 | 1/2011 | Ramakrishnan et al. |
| 2012/0289217 A1 * | 11/2012 | Riemer et al. ................ 455/418 |

FOREIGN PATENT DOCUMENTS

| | | |
|---|---|---|
| GB | 2473019 A | 3/2011 |
| KR | 2002-003888 A | 5/2002 |
| WO | 2005053178 A1 | 6/2005 |

* cited by examiner

SAFE STATE FOR NETWORKED DEVICES

RELATED APPLICATIONS

This application claims the benefit of and priority to U.S. provisional patent application Nos. 61/592,341 and 61/745,541, filed on Jan. 30, 2012 and Dec. 21, 2012, respectively.

BACKGROUND

In general, a networked device needs to be configured properly in order to operate as expected. For example, an unconfigured device or insufficiently configured device in a data network may, for example, lead to packets looping uncontrollably around the network consuming valuable bandwidth, thereby causing disruption to traffic and wasting processing power. As another example, an unconfigured device or insufficiently configured device in a data network may cause packets destined for a particular network destination to be inadvertently sent to an incorrect network destination.

In general, a device needs to be configured under various circumstances. For example, a new device may need to be configured when it replaces an old device. In another example, a device may need to be configured if a component within it fails. The network or the device may not function properly if it is incorrectly operational when the device is being configured. Accordingly, conventionally the device is taken offline for configuring, which usually requires the operation to be done onsite by an expert.

SUMMARY

Accordingly, a need has arisen to manage a networked device without in-depth expertise in device configuration. Moreover, a need has arisen to configure a networked device without disconnecting the device from the network for configuring purposes. Additionally, there is a need to place a device in a state where it does not cause disruption to operational functionality, e.g., packet forwarding, during the configuration process. Furthermore, it is desirable to place a device in a state where it does not cause a disruption to operational functionality if the device is insufficiently or incorrectly configured.

According to one embodiment, a device (either unconfigured or incorrectly configured) to be configured is placed in a "safe state" where it can be configured without disconnecting the device from the network. In "safe state," operational functionality of the device is disabled, e.g., in a data networking environment packet forwarding is disabled for instance. Accordingly, operational functionality of the device is disabled while the device can be managed and configured either remotely or locally. According to one embodiment, the device may be configured and/or managed either locally or in-band over the network. For example, management traffic, e.g., information for configuring a device, and data traffic may be carried over a same physical medium (referred to as "in-band" management) in a data network. Managing the device may include configuring the device, setting optional parameters, enabling/disabling features, updating firmware, monitoring device settings and performance, etc. Once the device is successfully configured, it may be taken out of "safe state" so that it can begin or resume its operational functionality.

In one exemplary embodiment, a device to be configured is in a data network, e.g., local area network (LAN), a wide area networks (WAN), a metro area networks (MAN), a wireless network, etc. It is appreciated that, as well as being able to be managed, the device may have an operational function, e.g., a switch forwarding data packets using the same physical infrastructure as the MAN, an IP telephone receiving data, non-computer networked operation such as factory pick-place machine, etc.

In one exemplary embodiment, a device to be configured in a data network may be coupled to other devices through various means, e.g., Ethernet ports, WAN ports, WLAN (wide local area network) interface, Bluetooth connection, etc. According to one embodiment, a networked device may start in a unconfigured state or incorrectly configured state. The device is placed in "safe state" to ensure that the device can receive management information over the network while its operational functionality, e.g., packet forwarding, is disabled. As such, the device may listen for "safe state" messages from one or more devices in the network. The device's interface may receive management information but it drops packets containing operational data. When in "safe state," the device awaits a "safe state" message.

According to one embodiment, management traffic is used by the device in "safe state" for the device to be managed, e.g., configured, monitored, etc., via its interface. It is appreciated that the network may carry management traffic and "safe state" messages as well as operational traffic data used by the device to perform its operational functionality.

Transmission of "safe state" messages may be initiated by other devices in the network when the unconfigured/incorrectly configured device becomes active. In one example, the "safe state" messages are sent by devices within the network periodically or in response to an explicit query by the unconfigured/incorrectly configured device.

In one exemplary embodiment, the unconfigured/incorrectly configured device may receive "safe state" messages on at least one interface from one or more devices on the network. The interface(s) associated with the device in an unconfigured/incorrectly configured state are designated as management interfaces. It is appreciated that an interface may be a port. Other interfaces of the unconfigured/incorrectly configured device may be designated as non-management interfaces. Management interfaces may accept management traffic while non-management interfaces are disabled or shut down and block reception of operational data packets. It is appreciated that shutting down one or more interface may be achieved by notifying devices at the other end of the link that the link is no longer available or by electrically disabling the interface.

While in a "safe state" the device continues to receive management traffic via its management interface(s), enabling the device to be newly configured, reconfigured, monitored, or have its firmware updated. Once device configuration is complete, the device may be taken out of its "safe state" and placed in its operational mode. If configuration fails, or as a result of user action, the device may remain in "safe state" so that the device will not disrupt operations of the network in spite of it not being configured properly.

In one exemplary embodiment, a method includes initiating a safe state for a device. The method may also include disabling an operational functionality of the device. A safe state message at an interface of the device may be received. The interface may be designated as a management interface. The management interface may receive information, wherein the information manages the device.

According to one embodiment, the method may further include disabling a non-management interface of the device, wherein the non-management interface is an interface that does not receive a safe state message. It is appreciated that the device in the safe state may be configurable in-band by at least another device in a network, and wherein the operational functionality includes forwarding data through a data network.

It is appreciated that the method may further include shutting down a non-management interface of the device, wherein the non-management interface is an interface that does not receive a safe state message. According to one embodiment, the method may further include configuring the device with the information received at the management interface.

In one embodiment, the method may further include initiating a normal state for the device, wherein in the normal state the device restores the operational functionality of the device. According to one embodiment, the safe state is initiated in response to the device starting up. In one other embodiment, the safe state is initiated in response to a user command.

According to one embodiment, a method includes initiating a safe state for a device. An operational functionality of the device may be disabled. A first plurality of safe state messages at a first plurality of interfaces of the device may be received within a certain period of time. According to one embodiment, the first plurality of interface is designated as management interfaces. In one exemplary embodiment, the management interfaces receive information. The received information may be used to configure the device.

According to one embodiment, the method may also include shutting down interfaces of the device other than the first plurality of interfaces. Interfaces of the device other than the first plurality of interfaces may be disabled. In one exemplary embodiment, a timer for measuring the certain period of time is started. It is appreciated that according to one embodiment, the device in the safe state is configurable in-band by at least another device in a network via the management interfaces, and wherein the operational functionality includes forwarding data through a data network.

According to one embodiment, the method may further include initiating a normal state for the device, wherein in the normal state the device restores the operational functionality of the device. It is appreciated that the safe state is initiated in response to the device starting up. In one embodiment, the safe state is initiated in response to a user command. According to one embodiment, the first plurality of safe state messages is received in response to a query by the device.

According to one embodiment, a method includes initiating a safe state for a device. An operational functionality of the device may be disabled. An interface of the device may receive information, wherein the information manages the device, e.g., configures the device. The method may further include designating the interface as a management interface, and wherein the designating occurs prior to the initiating. In one embodiment, the method includes deactivating a non-management interface of the device, wherein the non-management interface is an interface that does not receive a safe state message, configuring the device with the information received at the management interface, and initiating a normal state for the device, wherein in the normal state the device restores the operational functionality of the device.

In one embodiment, the method also includes receiving a safe state message at the interface prior to the receiving information, designating the interface as a management interface, and configuring the management interface prior to the receiving information.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "monitoring," "storing," "determining," "sending," "receiving," "transmitting," "providing," "placing," "accessing," "associating," "tracking," "disabling," "waiting," "enabling," "configuring," "initiating," timing," "starting," "terminating," "ending," "shutting down," "assigning," "configuring," "resetting," "setting," "listening" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

According to one embodiment, a device to be configured is placed in a "safe state" where it can be configured in-band. Moreover, a device that is incorrectly configured may be maintained in "safe state" in order to prevent disruption to the network or operational environment. In general, it may be desirable to place a device in "safe state" if the device is an unconfigured device and is connected to a network to be configured at a later time. Moreover, it may be desirable to place a device in "safe state" to configure and manage the device without physically disconnecting the device from the network. In some embodiments, a device may be placed in "safe state" in order to configure the device automatically from a backup configuration, or a new configuration, or from a local or remote server, for instance. It is appreciated that a device may also be placed in "safe state" in order to configure the device manually, e.g., user enter commands, user running a configuration script, user editing of configuration file, etc., from a remote location. It is appreciated that configuring a device refers to a series of commands, e.g., user entered or loaded set of configuration instructions, etc., that change device's behavior.

Furthermore, a device may be placed in "safe state" when automatic configuration of the device has failed and the device remains in an unconfigured state or incorrectly configured state. Placing the device in "safe state" prevents the device from disrupting functional operation, e.g., in a data network it prevents packets looping uncontrollably around the network, or packets of a VLAN inadvertently leaking to a different VLAN, etc. A remotely or locally located expert may manually or automatically configure the device.

According to one embodiment, an unconfigured device may automatically enter a "safe state" when the unconfigured device detects a connection to a network via one of its interface(s), e.g., ports in a data network. In one embodiment, an unconfigured device may automatically be placed in "safe state" in response to receiving a "safe state" message from another device within the same network. In "safe state," operational functionality of the device is disabled, e.g., in a data networking environment packet forwarding is disabled, even though the device can be managed and configured. A "safe state" message may be a message that communicates information about the presence and communication settings of devices that participate in the network of "safe state" compatible devices. In one exemplary embodiment, a device may be placed in "safe state" if a packet storm is detected. However, it is appreciated that a device may be placed in "safe state" manually, e.g., in response to a user (either locally or remotely) command.

According to one embodiment, the device to be configured may wait to receive the first "safe state" message for a predetermined amount of time after initialization. Initialization may occur after the device to be configured starts up, for instance. In one exemplary embodiment, the device to be configured may be placed in "safe state" if the first "safe state" packet is not received within the predetermined amount of time.

According to one embodiment, transmission of "safe state" messages may be triggered in response to one or more events. For example, a triggering event may be receipt of a link-up message from the device to be configured, or an explicit query/request from the device to be configured, or it may be transmitted periodically.

Operational functionalities of devices, e.g., data forwarding in a data network device, ringing functionality of an IP phone, no response to certain execution orders, etc., in "safe state" are disabled in order to prevent undesirable behavior, e.g., leakage of packets in a data network, uncontrollably looping of packets, an IP phone responding to incoming calls in unexpected ways, etc., for a device that is unconfigured or incorrectly configured. Devices in "safe state" can be configured and managed by other devices on the network. For example, the device may be newly configured, reconfigured, its firmware may be updated, etc.

In one embodiment, a device in "safe state" awaits one or more "safe state" messages. "safe state" messages may be used internally by the device. The "safe state" messages may contain information needed by the device to be managed via its respective interface, e.g., port in a data network. For example, "safe state" messages in a data network may contain information regarding the name of the network, the identity of neighboring devices in the same network, protocol characteristics of VLANs, network ID, type of cryptography used, IP address, MAC address, etc. The "safe state" messages may be received on one or more interfaces of the device to be configured. The management interface may be on a specific VLAN on a physical port, in a data network system. The "safe state" messages may be transmitted from one or more devices on the same network as the device to be configured. It is appreciated that in one embodiment, a management interface may be pre-designated, e.g., hardcoded within the firmware, preconfigured in the device, etc., prior to initiation of "safe state." Moreover, it is appreciated that in one embodiment, a management interface may also be configured prior to initiation of "safe state."

In one embodiment, the device to be configured may initiate a timer in response to receiving a first "safe state" message. The device designates interfaces of the device that receive "safe state" messages within the predetermined period of time as management interfaces. After the expiration of the timer, the device may shut down non-management interfaces of the device, e.g., by sending a message to devices connected to the other end of the interface link that the link is unavailable, electrically disabling the interface, etc. Non-management interfaces are interfaces that have not received "safe state" messages within the predetermined period of time.

The device in "safe state" continues to receive management traffic via its management interface, enabling it to be newly configured, reconfigured, monitored, or have its firmware updated. In one embodiment, once device configuration is complete, the device is taken out of its "safe state" automatically and placed in its operational mode. However, it is also appreciated that the device may be taken out of its "safe state" manually, e.g., through a user command. In one exemplary embodiment, the device may be taken out of "safe state" when it is re-started. In other words, the newly configured device is made operational and it becomes fully functional by starting its services or resuming its services Exemplary embodiments are described with respect to VLANs and ports but are not limited thereto. It is appreciated that while the embodiments of the present invention are described with respect to networking devices, the embodiments are equally applicable to other schemes, e.g., configuring devices in an assembly line, etc.

Figure 1:
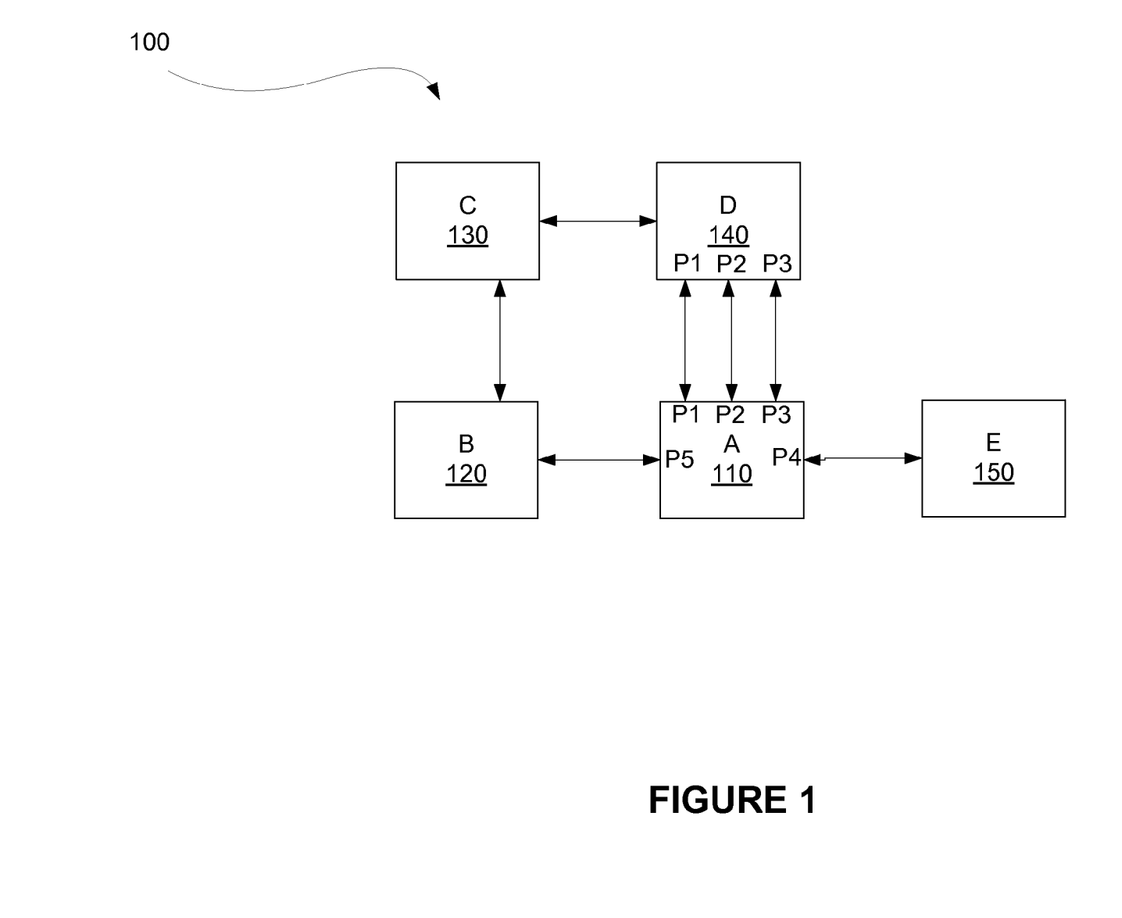
FIG. 1 shows configuration of an unconfigured device in one network topology in accordance with one embodiment.

Referring now to FIG. 1, configuring an unconfigured device in one exemplary network topology in accordance with one embodiment is shown. System 100 may include five devices, e.g., device A 110, device B 120, device C 130, device D 140, and device E 150. In this exemplary embodiment, device A 110 is a network switch. It is appreciated that the topology shown is exemplary and not intended to limit the scope of the present invention.

According to this example, device A 110, device B 120, device C 130, and device D 140 are part of a managed network. Each device within the managed network, e.g., device B 120, may store information that is provided to it from other devices and provide that information when requested.

In this example, device B 120 may contain a range of configuration files, firmware and persistent state information. Device B 120 may also have a distinctive identifier, e.g., typically a hostname or FQDN, uniquely identifying the device in the network. Whenever any of the node configuration details are modified, device B 120 may push out notification of identifier changes and file changes to peer devices, e.g., devices D 140, device C 130, etc. Peer devices may retain a record of identifiers associated with neighboring links. Locating peer devices may be done via static configuration or probing on network interfaces. Locating a device storing the information regarding the configuration files, firmware, persistent state information, etc., may be done via static configuration or a multicast discovery protocol. It is appreciated that in some embodiments a peer device may also store information regarding the configuration files, firmware, persistent state, etc.

In this embodiment, device A 110 may be unconfigured or incorrectly configured. Device A 110 may start functioning or provide its operational functionality if it is properly configured. However, in this example for illustrative purposes it is presumed that device A 110 starts up in an unconfigured state.

In this exemplary embodiment, operational functionalities of device A 110 are initially disabled in order to prevent it from disrupting functional operation, e.g., prevent packet leakage between VLANs, prevent packets from uncontrollably looping uncontrollably around the network consuming valuable bandwidth and wasting processing power, etc. Operational functionality of device A 110 in a data network environment may include packet forwarding. It is appreciated that packet forwarding may become enabled if the device is not placed in "safe state" after a certain period of time.

In this exemplary embodiment, device A 110 is placed in "safe state" and its packet forwarding is disabled, e.g., applying per-VLAN xSTP (spanning tree protocol) blocking to operational interfaces, placing operational interfaces into one or more VLANs and disabling those VLANs, removing operational interfaces of the device from VLANs, applying filtering rules to interfaces to drop or disallow non-management traffic, shutting down operational interfaces, etc. Device A 110 in "safe state" can be managed, e.g., locally or remotely, in-band. In other words, device A 110 may be configured, its firmware may be updated, etc., without causing network traffic disruption.

In this example, device A 110 is to be configured in order to become operational. The information needed, e.g., configuration information, to configure device A 110 may be transmitted from device B 120, device D 140, etc., or it may be supplied manually by a local or remote user. Once the configuration information is received by device A 110, the information may be used to modify configuration of device A 110.

In this exemplary embodiment, device A 110 includes five interfaces, e.g., ports, P1 through P5 that are linked to other devices of the network. However, it is appreciated that device A 110 may include any number of interfaces and links. As such, the five interfaces/links shown are merely for illustration purposes and are not intended to limit the scope of the present invention.

In this example, device E 150 does not support transmission of "safe state" messages.

It is appreciated that "safe state" messages may include packets that are periodically transmitted on links between devices on a network. "Safe state" messages may be transported on, for example, layer 2 links that are local to the network. It is appreciated that the "safe state" messages are not limited to layer 2 links and discussion with respect to layer 2 links are merely for illustrative purposes. For example, the "safe state" messages may be layer 3 packets, user datagram protocol (UDP) broadcast packets, etc. As such, discussion with respect to layer 2 links is exemplary and not intended to limit the scope of the present invention. It is appreciated that the links may also carry normal management and user traffic.

Device A 110 at start-up, in one exemplary embodiment, waits to receive a safe state message on one of its ports, e.g., ports P1, P2, P3, P4, or P5. It is appreciated that device A 110 may wait and listen for "safe state" messages for a preset amount of time. It is also appreciated that device A 110 may wait for "safe state" messages until some event occurs that indicates that waiting period should be terminated, e.g., a timer may expire. It is further appreciated that device A 110 may probe and query the network for "safe state" messages.

Devices on the network, e.g., device B 120 and device D 140, may detect a link-up event. A link-up event occurs when a link between two devices is established, e.g., a link between interface P1 of device A 110 and an interface on device D 140. In response to detecting a link-up event, one or more of, e.g., device B 120 and/or device D 140, may transmit "safe state" messages. For example, either device B 120 or device D 140 or both may transmit "safe state" messages on their respective interfaces to device A 110. For illustration purposes, it is presumed that device D 140 transmits "safe state" messages to device A 110 before device B 120.

In this example, interfaces P1, P2, and P3 on device A 110 and device D 140 are parallel links and may form part of an aggregated link. In one example, one link of multiple parallel links between devices may be designated as a management interface, as described above. In this example, one of the parallel links associated with interfaces P1, P2, and P3 is designated as a management interface because it received "safe state" messages. In this exemplary embodiment, links other than the link associated with the management interface are shut down to prevent them from being used by peer devices in the network, e.g., prevent peer device from transmitting subsequent management traffic.

It is appreciated that in one embodiment, a management interface may be pre-designated, e.g., hardcoded within the firmware. In one embodiment, the designated management interface may be preconfigured in the device, etc., prior to initiation of "safe state." Moreover, it is appreciated that in one embodiment, the designated management interface may also be configured after the initiation of "safe state."

It is appreciated that multiple management interfaces, e.g., parallel interfaces, may be designated between devices in the same network. However, only one management interface may be used and other identified management interfaces may be shut down. In one implementation, parallel interfaces may be recognized and aggregated into a single logical management interface. According to one embodiment, parallel interfaces may be recognized and all but one interface may be disabled. It is appreciated that parallel interfaces may be handled as separate management interfaces.

In this exemplary embodiment, the interfaces P1, P2, or P3 are aggregated on device D 140 and the initial "safe state" messages are received at one of the device A 110 interfaces, e.g., interface P2. However, it is appreciated that in other embodiments, device A 110 may have received "safe state" messages via the P1 or P3 interface, for instance.

In this example, interface P2 is designated as a management interface for device A 110 and interfaces P1 and P3 are shut down. Thus, device D 140 does not send further management traffic via interfaces P1 or P3.

According to one embodiment, device A 110 shuts down all non-management interfaces including P1, P3, and P4. Once the non-management interfaces are shut down, device A 110 is in a "safe state" where it has sufficient connectivity to be managed in-band. In one embodiment, device A 110 may also forward management traffic to the neighboring devices, if needed. As such, managing device downstream from device A 110 is now possible.

It is appreciated that device A 110 continues receiving management traffic until it has the required information to be configured. Once the required information is received, configuration of device A 110 may be initiated automatically or in response to a user initiation. It is appreciated that once device A 110 is successfully configured or updated, it may change its state from "safe state" to its operationally functional state in order to make the device fully operational. It is appreciated that changing states from "safe state" to operational functionally state may be through automatic means or manual means. It is appreciated that the device state may be changed by several means, e.g., restarting device A 110, manually undoing each individual part of the "safe state" (starting up non-management interfaces, enabling packet forwarding, enabling previously disabled interfaces in the VLANs, changing VLAN membership, etc.) by entering commands, manually undoing the "safe state" by entering a single command, automatically running a program on device A 110 to undo each part of "safe state," etc.

It is appreciated that the embodiments discussed with respect to FIG. 1 that show device A 110 being configured by devices directly connecting to it are exemplary and not intended to limit the scope of the present invention. For example, device C 130 may transmit "safe state" messages and/or management traffic to device A 110 via device B 120 to configure device A 110. In other words, device B 120 may create a transparent link between device A 110 and device C 130. This embodiment is discussed in the following sections with respect to FIG. 2.

Figure 2:
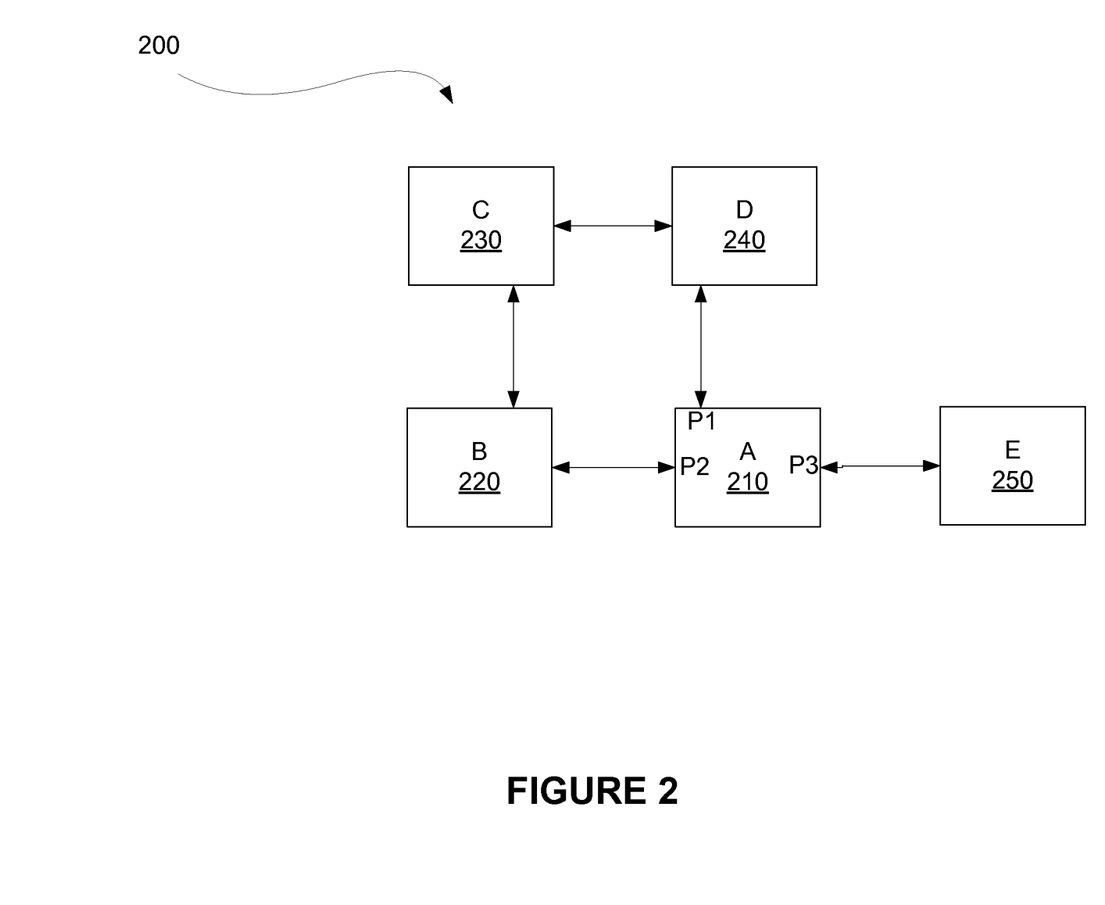
FIG. 2 shows configuration of an unconfigured device in another network topology in accordance with one embodiment.

FIG. 2 shows configuration of an unconfigured device in another network topology in accordance with one embodiment. In system 200, device A 210, device B 220, device C 230, device D 240, and device E 250 are coupled to one another similar to the topology shown in FIG. 1. Devices shown in this embodiment function substantially similar to that of FIG. 1. However, device A 210 in this embodiment comprises three ports P1, P2, and P3. Moreover, device C 230 can transmit "safe state" messages whereas device B 220 can only forward such messages.

Accordingly, in one embodiment, device B 220 may create a transparent link between device A 210 and device C 230. A transparent link, or tunnel, is a link between two devices in which the packets pass through one or more intermediary devices without being modified by the intermediary device or devices. In this exemplary embodiment, devices C 230 and D 240 may send "safe state" messages to device A 210. It is appreciated that device C 230 transmits "safe state" messages to device A 210 via device B 220. As such, device A 210 may be managed via device C 230 and/or device D 240 when device A 210 is in "safe state." Accordingly in "safe state," management of device A 210 is substantially similar to the management of device A 110 in the network described in of FIG. 1, which is discussed above and is therefore not repeated.

Figure 3:
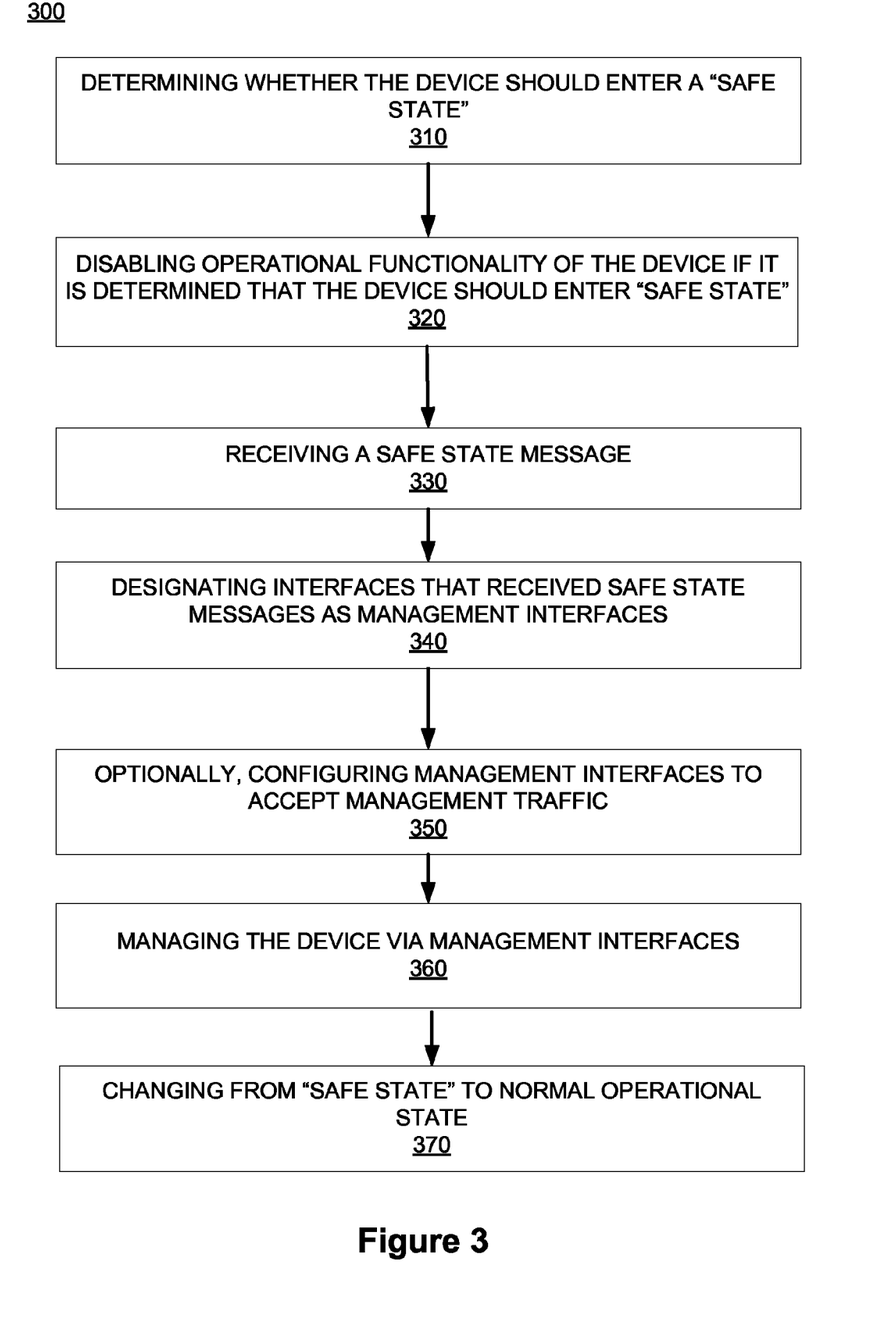
FIG. 3 shows an exemplary flow chart overview for configuring an unconfigured device in accordance with one embodiment.

FIG. 3 shows an exemplary flow chart overview 300 to configure an unconfigured or incorrectly configured device in accordance with one embodiment. At step 310, it is determined whether the device, e.g., device A 110, should be placed in "safe state." It may be determined that a device should be placed in "safe state" if the device is unconfigured, when the device is incorrectly configured, when previous configuration of the device has failed, etc. It is appreciated that the determination of whether the device should be placed in "safe state" may be automatic or manual. For example, a determination may be made that a device should be placed in "safe state" when an unconfigured device starts up, when a fault condition is detected, in response to a user command, etc.

At step 320, in response to determining that the device should be placed in "safe state," "safe state" is initiated and operational functionalities of the device are disabled. For example, in a data network environment, packet forwarding is disabled. Operational functionalities may be disabled in order to prevent causing incorrect functional operation.

At step 330, the device receives at least one "safe state" message through one or more interfaces associated therewith. For example, one or more devices e.g., devices D 140 and/or B 120 may transmit "safe state" messages to device A 110. According to one embodiment, transmission of "safe state" messages may be triggered in response to one or more events. For example, a triggering event may be receipt of a link-up message from the device to be configured, or an explicit query/request from the device to be configured, or "safe state" messages may be transmitted periodically.

At step 340, one or more interfaces, e.g., ports, of the device that have received "safe state" messages are designated as management interfaces.

At optional step 350, management interfaces are configured to receive management traffic, e.g., a port may be configured as a member of one or more VLANs. For example, filtering rules may be applied to the interfaces to drop or disallow non-management traffic.

At step 360, the device may be managed through its management interfaces. For example, the firmware may be updated, configuration information may be received in order to configure the device, etc. The received management traffic may be used to configure the device automatically or in response to a user command, in one instance. At step 370, the device is taken out of "safe state" and placed in its operational functional state. For example, functionalities of non-management interfaces are restored, packet forwarding capability is stored, etc. The device's state may be changed by several means, e.g., restarting device A 110, manually undoing each individual part of the "safe state" (starting up non-management interfaces, enabling packet forwarding, enabling previously disabled interfaces in the VLANs, changing VLAN membership, etc.) by entering commands, manually undoing the "safe state" by entering a single command, automatically running a program on device A 110 to undo each part of "safe state," etc.

Figure 4:
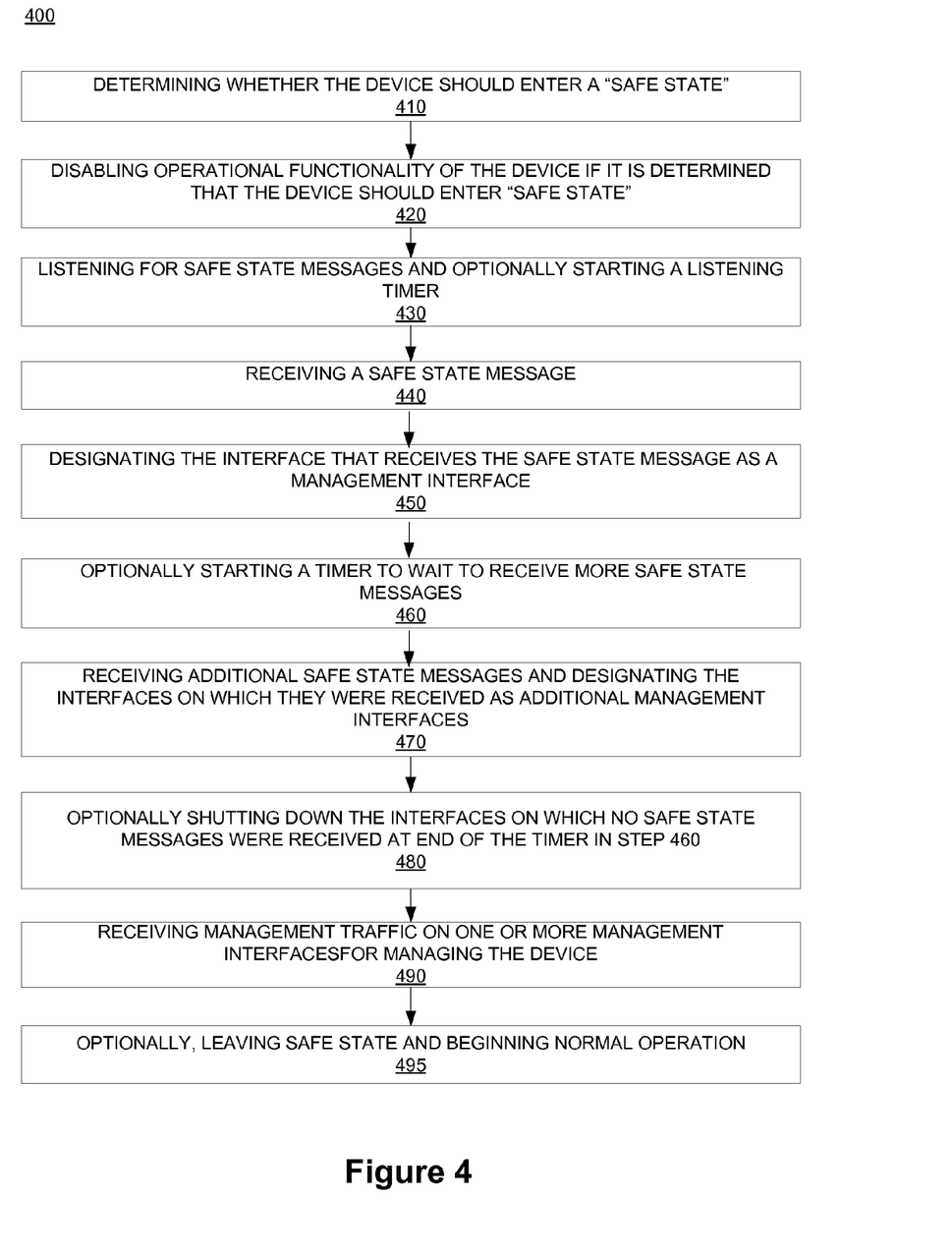
FIG. 4 shows a detailed exemplary flow diagram for configuring an unconfigured device in accordance with one embodiment.

FIG. 4 shows a detailed exemplary flow diagram 400 to configure an unconfigured or incorrectly configured device in accordance with one embodiment. At step 410, it is determined whether the device, e.g., device A 110, should be placed in "safe state." It may be determined that a device should be placed in "safe state" if the device is unconfigured, when the device is incorrectly configured, when previous configuration of the device has failed, etc. It is appreciated that the determination of whether the device should be placed in "safe state" may be automatic or manual. For example, a determination may be made that a device should be placed in "safe state" when an unconfigured device starts up, when a fault condition is detected, in response to a user command, etc.

At step 420, in response to determining that the device should be placed in "safe state," "safe state" is initiated and operational functionalities of the device are disabled. For example, in a data network environment, packet forwarding is disabled. Operational functionalities may be disabled in order to prevent causing disruption to functional operation. It is appreciated that the device may resume/start its operational functionality functionalities if it is determined that there is no need to place the device in "safe state."

At step 430, the device may listen for "safe state" messages. It is appreciated that in one optional embodiment, a timer may start for listening for the "safe state" messages for a predetermined period of time. If no "safe state" message is received within that period of time, the device may begin its operational functionality. In one embodiment, the device may remain in "safe state" with its normal functionalities disabled until "safe state" messages are received.

At step 440, the device receives at least one "safe state" message through one or more interfaces associated therewith. For example, one or more devices, e.g., devices D 140 and/or B 120, may transmit "safe state" messages to device A 110. According to one embodiment, transmission of "safe state" messages may be triggered in response to one or more events. For example, a triggering event may be receipt of a link-up message from the device to be configured, or an explicit query/request from the device to be configured, or "safe state" messages may be transmitted periodically, etc.

At step 450, the interface that receives the first "safe state" message is designated as a management interface. This designation affects the behavior of the interface in subsequent steps, e.g., the designation may cause the interface to be configured as a member of one or more particular VLANs. Optionally, at step 460, a timer may start for receiving additional "safe state" messages via additional interfaces. It is appreciated that the timer for receiving additional "safe state" messages may be active for a certain period of time. It is appreciated that at step 470, additional interfaces that have received the additional "safe state" messages, e.g., during the certain period of time being tracked by the timer, may be designated as additional management interfaces. According to one embodiment, only one interface may be designated as a management interface if "safe state" messages from the same device are received via multiple interfaces.

Optionally at step 480, interfaces that have not received any "safe state" messages at the end of timer expiration at step 460, are shut down, e.g., by sending a message to devices connected to the other end of the interface link that the link is unavailable, electrically disabling the interface, etc. For example, interfaces P1, P3, and P4 of device A 110 are shut down. At step 490, management traffic is received through one or more management interfaces in order for the device to be managed, e.g., the device may be newly configured, reconfigured, etc. The received management traffic may be used to configure the device, for instance.

It is appreciated that device configuration may be automatic or in response to a user entered command. Once the device is successfully managed, e.g., fully configured, it may optionally leave "safe state" and resume/start its operational functionalities, at step 495. For example, functionalities of non-management interfaces are restored, packet forwarding capability is stored, etc. The device's state may be changed by several means, e.g., restarting device A 110, manually undoing each individual part of the "safe state" (starting up non-management interfaces, enabling packet forwarding, enabling previously disabled interfaces in the VLANs, changing VLAN membership, etc.) by entering commands, manually undoing "safe state" by entering a single command, automatically running a program on device A 110 to undo each part of "safe state," etc.

Figure 5:
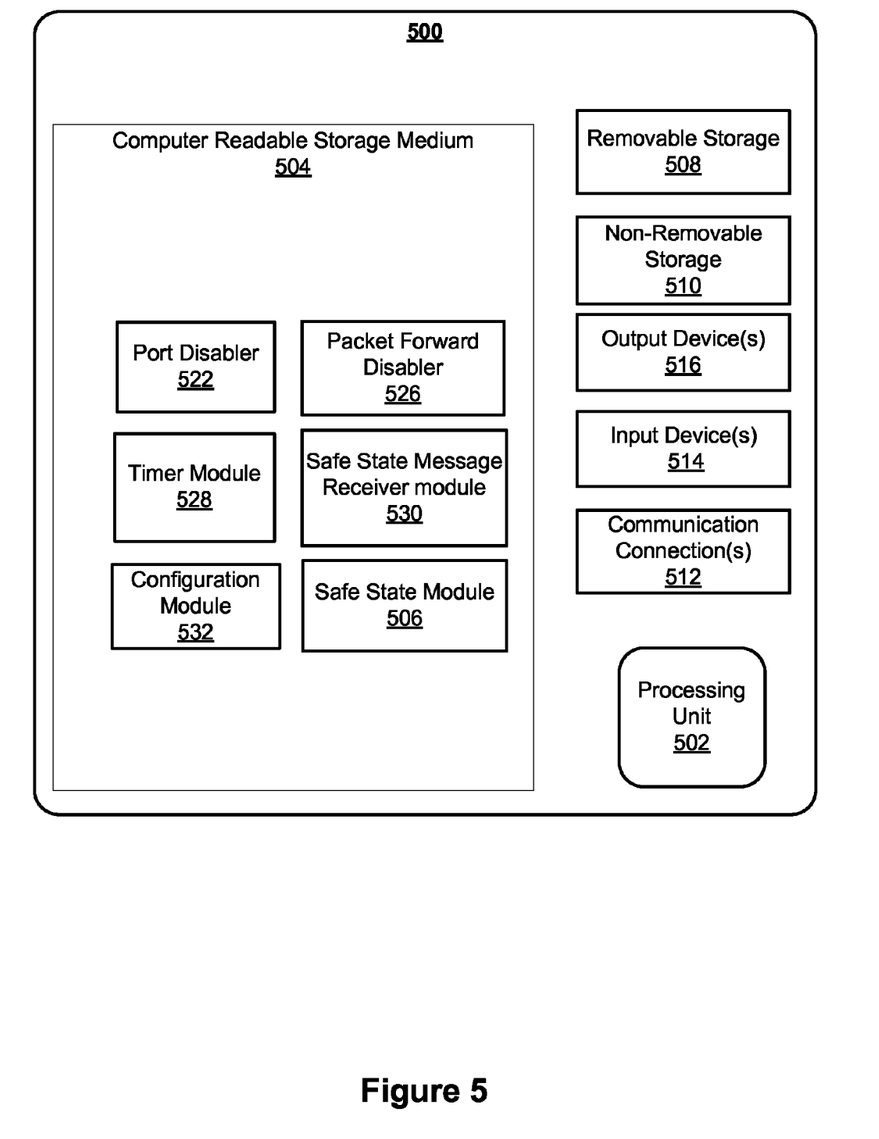
FIG. 5 shows a block diagram of an exemplary computer system in accordance with one embodiment of the present invention.

Referring now to FIG. 5, a block diagram of an exemplary computer system in accordance with one embodiment of the present invention is shown. With reference to FIG. 5, an exemplary system module for implementing embodiments includes a general purpose computing system environment, such as computing system environment 500. Computing system environment 500 may include, but is not limited to, servers, switches, routers, desktop computers, laptops, tablets, mobile devices, and smartphones. In its most basic configuration, computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed facilitate the configuring of devices according to embodiments of the present invention (e.g., processes 300 and 400).

Additionally in various embodiments, computing system environment 500 may also have other features/functionality. For example, computing system environment 500 may also include additional storage (removable and/or non-removable) including, but not limited to, magnetic or optical disks or tape. Such additional storage is illustrated by removable storage 508 and non-removable storage 510. Computer storage media includes volatile and nonvolatile, removable and non-removable media implemented in any method or technology for storage of information such as computer readable instructions, data structures, program modules or other data. Computer readable medium 504, removable storage 508 and nonremovable storage 510 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

In some embodiments, computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 512 may allow computing system environment 500 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 512 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 500 may also have input device(s) 514 such as keyboard, mouse, a terminal or terminal emulator (either directly connected or remotely accessible via telnet, SSH, http, SSL, etc.), pen, voice input device, touch input device, remote control, etc. Output device(s) 516 such as a display, a terminal or terminal emulator (either directly connected or remotely accessible via telnet, SSH, http, SSL, etc.), speakers, LEDs, etc. may also be included. All these devices are well known in the art and are not discussed at length.

In one embodiment, computer readable storage medium 504 includes a port disabler module 522, a packet forward disabler module 526, a timer module 528, a "safe state" message receiver module 530, a configuration module 532, and a safe state module 506. The port disabler module 522 is operable to disable ports of the device, e.g., as discussed with respect to steps 350 and 460. The packet forward disabler module 526 may be used to disable packet forwarding in response to entering a "safe state," as discussed with respect to steps 350 and 440. The timer 528 module operates to initiate and terminate the time interval during which management ports are determined, as discussed with respect to steps 430-460. The "safe state" message receiver module 530 is operable to receive "safe state" messages from other devices on the network. The configuration module 532 is operable to configure the unconfigured device based on the received configuration information received via management ports. The safe state module 506 is operable to detect whether the device is unconfigured or insufficiently configured in order to initiate the "safe state."

It is appreciated that implementations according to embodiments of the present invention that are described with respect to a computer system are merely exemplary and not intended to limit the scope of the present invention. For example, embodiments of the present invention may be implemented on devices such as switches and routers, which may contain application specific integrated circuits (ASICs), field programmable gate arrays (FPGAs), etc. It is appreciated that these devices may include a computer readable medium for storing instructions for implementing methods according to flow diagrams 300 and 400.

Figure 6:
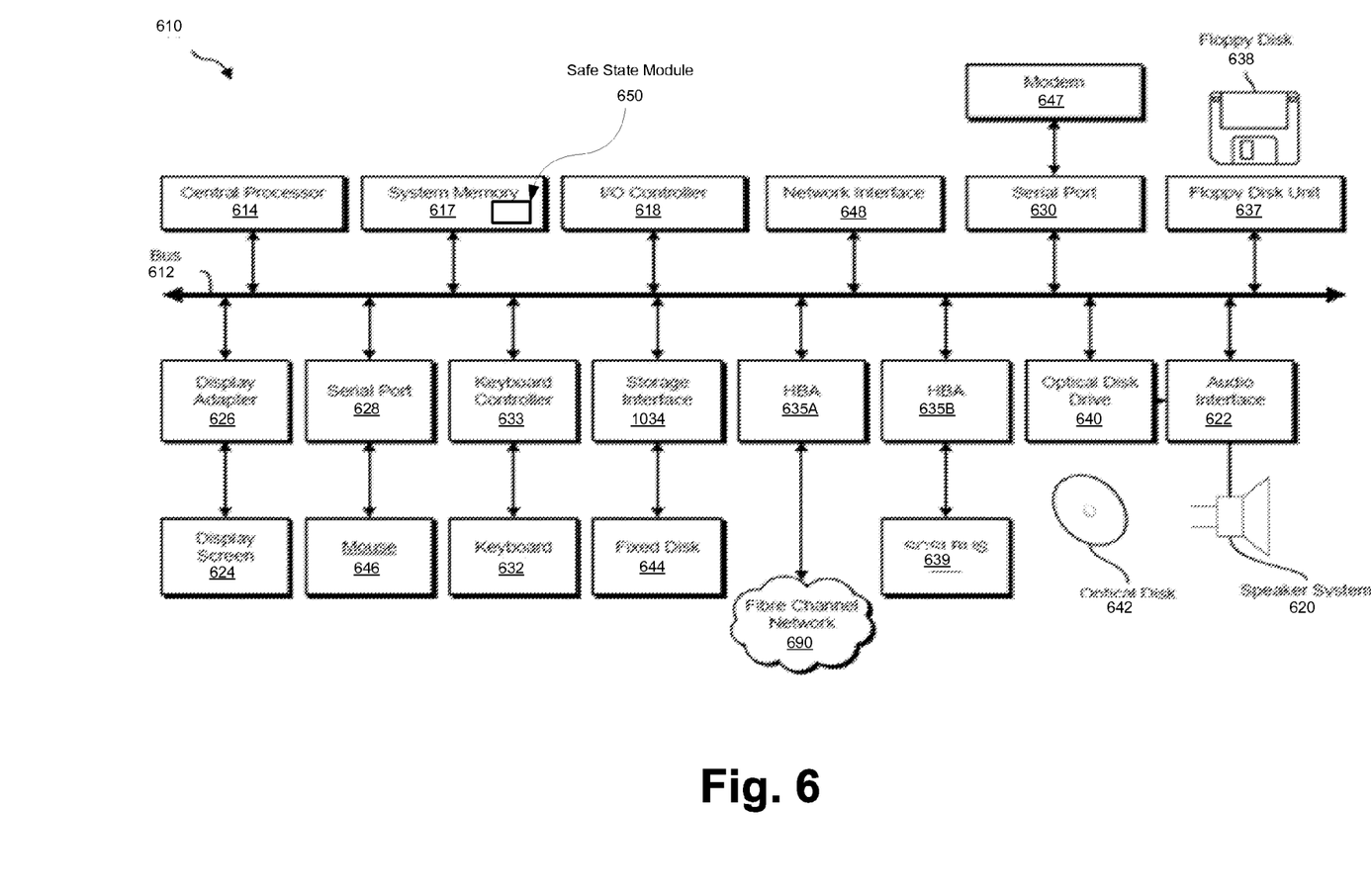
FIG. 6 shows a block diagram of another exemplary computer system in accordance with one embodiment of the present invention.

Referring now to FIG. 6, a block diagram of another exemplary computer system in accordance with one embodiment of the present invention is shown. FIG. 6 depicts a block diagram of a computer system 610 suitable for implementing the present disclosure. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612). It is appreciated that the network interface 648 may include one or more Ethernet ports, wireless local area network (WLAN) interfaces, etc., but are not limited thereto. System memory 617 includes a "safe state" module 650 which is operable to place the unconfigured or insufficiently configured device into "safe state" and further is operable to configure the device. According to one embodiment, the "safe state" module 650 may include other modules for carrying out various tasks. For example, "safe state" module 650 may include the port disabler module 522, the packet forward disabler module 526, the timer module 528, the "safe state" message receiver module 530, the configuration module 532, as discussed with respect to FIG. 5 above. It is appreciated that the "safe state" module 650 may be located anywhere in the system and is not limited to the system memory 617. As such, residing within the system memory 617 is merely exemplary and not intended to limit the scope of the present invention. For example, parts of the "safe state" module 650 may be located within the central processor 614 and/or the network interface 648 but are not limited thereto.

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Network interface 648 may provide multiple connections to networked devices. Furthermore, modem 647 may provide a direct connection to a remote server via a telephone link or to the Internet via an internet service provider (ISP). Network interface 648 provides one or more connections to a data network, which may consist of any number of other network-connected devices. Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A system comprising:
a first device comprising a processor and addressable memory; and
a second device comprising a processor and addressable memory coupled to the first device in a network,
wherein the first device is configured to send one or more safe state environment messages, wherein the second device autonomously determines it needs to be managed and initiates a safe state in response to detecting a link-up between the first device and the second device and receiving a safe state environment message of the one or more safe state environment messages, wherein the second device is further configured to disable an operational functionality, wherein the disabling of the operational functionality includes packet forwarding functionality of the second device, and wherein an interface of the second device that received the safe state environment message is designated as a management interface, and wherein the management interface of the second device is configured to receive information for managing the second device.

2. The system as described in claim 1, wherein a non-management interface of the second device is disabled, wherein the non-management interface is an interface that does not receive a message that is of a same type as the first message, wherein the disabled packet forwarding functionality of the second device is where packets received on one interface are forwarded out one or more interfaces, and wherein the initiated safe state changes an operational state and a behavior of the second device.

3. The system as described in claim 1, wherein the second device in said safe state is configurable in-band by at least one of: the first device in the network and a third device comprising a processor and addressable memory; and wherein the in-band configuration affects the configuration of the second device.

4. The system as described in claim 1, wherein a non-management interface of the second device is shut down, wherein the non-management interface is an interface that does not receive a message that is of a same type as the first message, and wherein the interface of the second device is a physical network interface.

5. The system as described in claim 1, wherein the second device is configured with said information received at the management interface, and wherein the interface of the second device is a logical network interface.

6. The system as described in claim 1, wherein a normal state for the second device is initiated, wherein in the normal state the second device restores the operational functionality of the second device, and wherein the interface of the second device is a physical port on a network switch.

7. The system as described in claim 1, wherein the safe state is autonomously initiated in response to the second device starting up, and wherein the safe state is not a predetermined state.

8. The system as described in claim 1, wherein the safe state is initiated in further response to detecting that the second device is unconfigured, and wherein initiating the safe state is not a scheduled activity.

9. A system comprising:
a first device comprising a processor and addressable memory; and
a second device comprising a processor and addressable memory coupled to the first device in a network,
wherein the first device is configured to send one or more safe state environment messages, wherein the second device in response to detecting a fault condition in the second device and receiving a first plurality of safe state environment messages of the one or more safe state environment messages autonomously determines that the second device needs to be managed and initiates a safe state, wherein the second device is further configured to disable an operational functionality of the second device, wherein the disabling of the operational functionality includes packet forwarding functionality of the second device, and wherein a first plurality of interfaces of the second device to be managed is configured to receive a first plurality of messages within a certain period of time and wherein the first plurality of interfaces is designated as management interfaces, and wherein the management interfaces are configured to receive information associated with configuring the second device.

10. The system as described in claim 9, wherein interfaces of the second device other than the first plurality of interfaces are shut down.

11. The system as described in claim 9, wherein interfaces of the second device other than the first plurality of interfaces are disabled.

12. The system as described in claim 9, wherein the second device is configured to start a timer for measuring the certain period of time, wherein the second device remains in the safe state for the certain period of time and wherein the second device resumes normal operation after expiration of the certain period of time if no safe state message is received from the first device.

13. The system as described in claim 9, wherein the second device to be managed in the safe state is configurable in-band by the first device in via the management interfaces.

14. The system as described in claim 9, wherein the second device is configured with the information received at the management interfaces.

15. The system as described in claim 9, wherein a normal state for the second device to be managed is initiated, wherein in the normal state the second device to be managed restores the operational functionality of the second device to be managed.

16. The system as described in claim 9, wherein the safe state is initiated in further response to the device to be managed starting up.

17. The system as described in claim 9, wherein the safe state is initiated in further response to a user command.

18. The system as described in claim 9, wherein the first plurality of the messages is received in response to a query by the second device to be managed.

19. A system comprising:
a first device comprising a processor and addressable memory; and
a second device comprising a processor and addressable memory coupled to the first device in a network,
wherein the first device is configured to send one or more safe state environment messages, wherein the second device determines it needs to be managed and initiates a safe state in response to a request by the second device to be configured and receiving a safe state environment message of the one or more safe state environment messages, wherein the second device is further configured to disable an operational functionality, wherein the disabling of the operational functionality includes packet forwarding functionality of the second device, and wherein an interface of the second device that received the safe state environment message is designated as a management interface, and wherein the management interface of the second device is configured to receive information for configuring the second device.

20. The system as described in claim 19, wherein all interfaces of the second device other than the management interface are disabled.

21. The system as described in claim 19, wherein a normal operation for the second device is initiated subsequent to the initiation of the safe state by enabling the operational functionality of the second device including enabling the packet forwarding functionality.

22. The system as described in claim 21, wherein the normal operation for the second device is initiated subsequent to restarting the second device.

* * * * *